US011167261B2

(12) United States Patent
Lee et al.

(10) Patent No.: US 11,167,261 B2
(45) Date of Patent: Nov. 9, 2021

(54) SOLID RAW MATERIAL FOR CARBON DIOXIDE ABSORBENT, CARBON DIOXIDE ABSORBENT COMPOSITION COMPRISING SAME, AND CARBON DIOXIDE ABSORBENT PREPARED USING SAME

(71) Applicants: KOREA ELECTRIC POWER CORPORATION, Naju-si (KR); KOREA SOUTH-EAST POWER CO., LTD., Jinju-si (KR); KOREA MIDLAND POWER CO., LTD., Boryeong-si (KR); KOREA SOUTH POWER CO., LTD., Busan (KR); KOREA WESTERN POWER CO., LTD., Taean-gun (KR)

(72) Inventors: Joong Beom Lee, Daejeon (KR); Tae Hyoung Eom, Sejong (KR); Hyun Geun Jo, Daejeon (KR); Jeom In Baek, Daejeon (KR); Ui Sik Kim, Daejeon (KR)

(73) Assignees: KOREA ELECTRIC POWER CORPORATION, Naju-si (KR); KOREA SOUTH-EAST POWER CO., LTD., Jinju-si (KR); KOREA MIDLAND POWER CO., LTD., Boryeong-si (KR); KOREA SOUTH POWER CO., LTD., Busan (KR); KOREA WESTERN POWER CO., LTD., Taean-Gun (KR)

( * ) Notice: Subject to any disclaimer, the term of this patent is extended or adjusted under 35 U.S.C. 154(b) by 299 days.

(21) Appl. No.: 16/340,065

(22) PCT Filed: Nov. 18, 2016

(86) PCT No.: PCT/KR2016/013312
§ 371 (c)(1),
(2) Date: Apr. 5, 2019

(87) PCT Pub. No.: WO2018/066751
PCT Pub. Date: Apr. 12, 2018

(65) Prior Publication Data
US 2019/0308163 A1 Oct. 10, 2019

(30) Foreign Application Priority Data

Oct. 7, 2016 (KR) .......................... 10-2016-0129891

(51) Int. Cl.
B01J 20/04 (2006.01)
B01D 53/02 (2006.01)
B01J 20/28 (2006.01)
B01J 20/30 (2006.01)
B01J 20/02 (2006.01)

(52) U.S. Cl.
CPC ............ *B01J 20/043* (2013.01); *B01D 53/02* (2013.01); *B01J 20/02* (2013.01); *B01J 20/04* (2013.01); *B01J 20/28* (2013.01); *B01J 20/2803* (2013.01); *B01J 20/28004* (2013.01); *B01J 20/28011* (2013.01); *B01J 20/28019* (2013.01); *B01J 20/28059* (2013.01); *B01J 20/30* (2013.01); *B01J 20/3042* (2013.01); *B01J 20/3078* (2013.01); *B01D 2253/10* (2013.01); *B01D 2253/306* (2013.01); *B01D 2257/504* (2013.01)

(58) Field of Classification Search
CPC ....... B01J 20/024; B01J 20/0207; B01J 20/04
See application file for complete search history.

(56) References Cited

U.S. PATENT DOCUMENTS

| 4,702,898 | A | * | 10/1987 | Grover | .................. | B01D 53/14 423/220 |
| 6,280,503 | B1 | | 8/2001 | Mayorga et al. | | |
| 7,045,483 | B2 | | 5/2006 | Noda et al. | | |
| 2014/0305302 | A1 | * | 10/2014 | Kwon | ................ | B01J 20/28069 95/139 |

FOREIGN PATENT DOCUMENTS

| CN | 102764578 A | 11/2012 |
| CN | 104289040 A | 1/2015 |
| GB | 819215 A | 9/1959 |
| GB | 1113613 A | 5/1968 |
| JP | S6354943 A | 3/1988 |
| JP | 2000-281334 A | 10/2000 |
| KR | 10-1155303 B1 | 6/2012 |
| KR | 10-2013-0001467 A | 1/2013 |
| KR | 10-2013-0034434 A | 4/2013 |
| KR | 10-2014-0123849 A | 10/2014 |
| KR | 10-2015-0114724 A | 10/2015 |

OTHER PUBLICATIONS

English machine translation of KR 10-1155303B1 (Year: 2012).*
Communication from Korean Intellectual Property Office for Office Action dated Jul. 16, 2018 of the Korean patent application No. 10-2016-0129891, which corresponds to the present application.
Communication from Korean Intellectual Property Office for Notice of Allowance dated Dec. 20, 2018 of the Korean patent application No. 10-2016-0129891, which corresponds to the present application.

(Continued)

*Primary Examiner* — Peter F Godenschwager

(74) *Attorney, Agent, or Firm* — Foundation Law Group, LLP

(57) ABSTRACT

The present invention relates to a carbon dioxide absorbent used for absorbing carbon dioxide, a carbon dioxide absorbent composition used for producing the carbon dioxide absorbent, and a solid raw material for a carbon dioxide absorbent included in the carbon dioxide absorbent.

8 Claims, No Drawings

(56) References Cited

OTHER PUBLICATIONS

Communication from Korean Intellectual Property Office for Office Action dated Jun. 28, 2021 of the Chinese Patent application No. 201680089919.X, which corresponds to the present application.

* cited by examiner

SOLID RAW MATERIAL FOR CARBON DIOXIDE ABSORBENT, CARBON DIOXIDE ABSORBENT COMPOSITION COMPRISING SAME, AND CARBON DIOXIDE ABSORBENT PREPARED USING SAME

CROSS-REFERENCE TO RELATED APPLICATIONS

This application is the National Stage filing under 35 U.S.C. 371 of International Application No. PCT/KR2016/013312, filed on Nov. 18, 2016, which claims the benefit of earlier filing date and right of priority to Korean Application No. 10-2016-0129891, filed on Oct. 7, 2016, the contents of which are all hereby incorporated by reference herein in their entirety.

TECHNICAL FIELD

The present invention relates to a carbon dioxide absorbent composition used for producing a carbon dioxide absorbent, and a solid raw material for a carbon dioxide absorbent included in the composition.

BACKGROUND ART

Carbon dioxide is recognized as one of the main materials that cause climate change, but the number of large-scale facilities that emit such carbon dioxide to 100,000 tons or more annually is globally about 7,900 and a large amount of carbon dioxide is being emitted. Accordingly, in order to stabilize carbon dioxide in the atmosphere, it is required for a large-scale carbon dioxide emission facility to first capture carbon dioxide.

Examples of a method for capturing carbon dioxide from the large-scale carbon dioxide emission facility include methods such as wet chemical absorption, absorption, membrane separation, and low temperature cooling separation. However, these methods have problems in that the recovery costs thereof are high, or it is difficult to be applied to a power plant or a large-scale industry body.

In addition to the aforementioned methods, examples of a method for capturing carbon dioxide include a dry $CO_2$ capture technology. The technology is a method for capturing carbon dioxide as a process of repeating separation of pure carbon dioxide and regeneration of an absorbent by using water steam and an additional heat source after carbon dioxide included in a flue gas is captured by using a solid absorbent instead of a liquid absorbent used in a wet chemical cleaning in the related art. The technology has advantages in that the capture of carbon dioxide is more efficient, and as the process of a fluidized bed is applied, an installation area of a carbon dioxide capturing device is small and the operation is easy.

Examples of patents in the related art, which relate to the absorbent used for the dry $CO_2$ capture technology, include U.S. Pat. Nos. 7,045,483, 6,280,503, and the like. However, the patents are mainly limited to the improvement of a combination of an active material, a support, and inorganic and organic binders; or a combination of an active material and a support; or an active component, and have a problem in that the patients are not suitable for producing an absorbent in a large amount because the production methods are different from each other, such as a production by physical mixing or production by a supporting method. Further, since the absorption performance and regeneration performance of carbon dioxide of the absorbent deteriorate, there is a limit in using the absorbent for a long period of time, so that there is a problem in that the efficiency of using the absorbent is also reduced.

In addition, when an absorbent used for the dry $CO_2$ capture technology is used in an environment where moisture and carbon dioxide coexist, carbon dioxide and moisture are competitively adsorbed, and for this reason, there is also a problem in that the absorption performance of carbon dioxide of the absorbent deteriorates.

DISCLOSURE OF THE INVENTION

Therefore, an object of the present invention is to provide a solid raw material for a carbon dioxide absorbent, which is used for producing a carbon dioxide absorbent having excellent absorption performance of carbon dioxide and regeneration performance in a regeneration process even in a humid environment, and a carbon dioxide absorbent composition including the same.

Further, an object of the present invention is to provide a carbon dioxide absorbent produced by using the carbon dioxide absorbent composition.

In addition, an object of the present invention is to provide a method for producing the carbon dioxide absorbent.

To achieve these and other advantages and in accordance with the purpose of the present invention, as embodied and broadly described herein, there is provided a solid raw material for a carbon dioxide absorbent, including: an active component; a first support; a second support; an inorganic binder; and a regeneration enhancer, in which the second support includes one or more selected from the group consisting of lanthanum aluminate, lanthanum carbonate, lanthanum acetate, lithium borate, sodium borate, and zinc borate.

Further, the present invention provides a carbon dioxide absorbent composition including: the solid raw material for a carbon dioxide absorbent; and a solvent.

In addition, the present invention provides a carbon dioxide absorbent produced by using the carbon dioxide absorbent composition.

Furthermore, the present invention provides a method for producing a carbon dioxide absorbent, the method including: producing solid particles by spray-drying a carbon dioxide absorbent composition; drying the solid particles at a temperature within a range of 110 to 150° C.; and firing the dried solid particles at a temperature within a range of 350 to 1,000° C.

A carbon dioxide absorbent of the present invention satisfies physical characteristics such as a spherical shape, a packing density, and an abrasion index, which are conditions of an absorbent required for a power plant or a large-scale industry body, and may be repeatedly used for a long period of time due to excellent absorption performance of carbon dioxide and regeneration performance in a regeneration process. In particular, since the carbon dioxide absorbent of the present invention includes a second support having hydrophobicity, it is possible to minimize deterioration in absorption performance (deterioration in activity) of an absorbent caused by a side reaction with a component (for example, moisture) other than carbon dioxide even though the absorption process of carbon dioxide is carried out in a humid environment.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, the present invention will be described.

1. Solid Raw Material for Carbon Dioxide Absorbent

The solid raw material for a carbon dioxide absorbent (hereinafter, referred to as 'a solid raw material') of the present invention includes an active component, a first support, a second support, an inorganic binder, and a regeneration enhancer.

The active component is a material which selectively reacts with carbon dioxide included in a flue gas. The active component is not particularly limited, but it is preferred that the active component includes one or more selected from the group consisting of alkali metal oxides, alkaline earth metal oxides, alkali metal carbonates, alkaline earth metal carbonates, alkali metal bicarbonates, alkaline earth metal bicarbonates, and precursors thereof. In this case, the precursor means a material capable of being converted into an active component. Specifically, the active component may be composed of one or more selected from the group consisting of potassium carbonate, potassium bicarbonate, potassium hydroxide, sodium carbonate, sodium bicarbonate, sodium hydroxide, calcium hydroxide, magnesium hydroxide, magnesium oxide, calcium oxide, and zinc oxide, and is preferably potassium carbonate ($K_2CO_3$) in consideration of absorption performance of carbon dioxide of the absorbent.

A content of the active component is not particularly limited, but is preferably 5 to 70 parts by weight, and more preferably 20 to 50 parts by weight, based on 100 parts by weight of the solid raw material. When the content of the active component is less than 5 parts by weight, the absorption performance of carbon dioxide of the absorbent may deteriorate, and when the content of the active component is more than 70 parts by weight, physical characteristics (for example, a strength, a packing density, an abrasion index, and the like) of the absorbent may deteriorate.

The first support is a material that supports an active component such that the active component is uniformly dispersed (distributed) in an absorbent, and controls the adsorption (absorption) of moisture which affects the absorption reaction of carbon dioxide. The first support is not particularly limited, but it is preferred that the first support includes one or more selected from the group consisting of alumina, calcium silicate, magnesia, silica, hydrotalcite, ceria, lanthania, yttria, and tin oxide. It is preferred that the alumina is one or more selected from the group consisting of α-alumina and γ-alumina, and it is preferred that the specific surface area thereof is 10 to 300 $m^2/g$. When the specific surface area of the alumina is less than 10 $m^2/g$, dispersibility of the active component may deteriorate, and when the specific surface area of the alumina is more than 300 $m^2/g$, physical characteristics of the absorbent may deteriorate.

A content of the first support is not particularly limited, but is preferably 1 to 70 parts by weight, and more preferably 5 to 50 parts by weight, based on 100 parts by weight of the solid raw material. When the content of the first support is less than 1 part by weight, physical characteristics of the absorbent may deteriorate, and when the content of the first support is more than 70 parts by weight, the absorption performance of carbon dioxide of the absorbent may deteriorate due to the reduction in content of the active component.

The second support is hydrophobic and is a material that adjusts the degree of adsorption of moisture adsorbed by an absorbent and blocks the wetting phenomenon of the absorbent due to adsorption of excess moisture. The second support includes one or more selected from the group consisting of lanthanum aluminate, lanthanum carbonate, lanthanum acetate, lithium borate, sodium borate, and zinc borate so as to be able to exhibit high hydrophobicity with respect to moisture.

It is preferred that the second support is a spherical particle having a size (particle diameter) of 5 μm or less (specifically, 0.1 to 5 μm) in consideration of production of the absorbent and absorption performance of carbon dioxide. Further, it is preferred that the second support has a specific surface area of 10 $m^2/g$ or more (specifically, 10 to 200 $m^2/g$).

A content of the second support is not particularly limited, but is preferably 1 to 60 parts by weight, and more preferably 1 to 40 parts by weight, based on 100 parts by weight of the solid raw material. When the content of the second support is less than 1 part by weight, the hydrophobicity of the absorbent is exhibited so slightly that it may be difficult to suppress the deterioration in performance of the absorbent in a humid environment, and when the content of the second support is more than 60 parts by weight, the absorption performance of carbon dioxide of the absorbent may deteriorate due to the lack of moisture required for the absorption reaction of carbon dioxide.

The inorganic binder is a material that increases the strength and abrasion index of an absorbent by improving the bonding strength of each component at the time of producing the absorbent. The inorganic binder is not particularly limited, but it is preferred that the inorganic binder includes one or more selected from the group consisting of cements, clays, and ceramics. Examples of the cements include calcium silicate, calcium aluminate, or the like, examples of the clays include bentonite, kaolin, or the like, and examples of the ceramics include aluminasol, silicasol, boehmite, or the like. Specifically, it is preferred that the inorganic binder is a mixture of bentonite and boehmite in consideration of physical characteristics of the absorbent.

A content of the inorganic binder is not particularly limited, but is preferably 5 to 70 parts by weight, and more preferably 5 to 40 parts by weight, based on 100 parts by weight of the solid raw material. When the content of the inorganic binder is less than 5 parts by weight, physical characteristics of the absorbent may deteriorate, and when the content of the inorganic binder is more than 70 parts by weight, the absorption performance of carbon dioxide of the absorbent may deteriorate due to the reduction in content of the active component.

2. Carbon Dioxide Absorbent Composition

The present invention provides a carbon dioxide absorbent composition including a solid raw material and a solvent.

The description on the solid raw material is the same as that described in '1. Solid Raw Material for Carbon Dioxide Absorbent', and thus will be omitted.

A content of the solid raw material is not particularly limited, but is preferably 20 to 50 parts by weight, and more preferably 20 to 40 parts by weight, based on 100 parts by weight of the carbon dioxide absorbent composition. When the content of the solid raw material is less than 20 parts by weight, the moldability of the absorbent and the absorption performance of carbon dioxide of the absorbent may deteriorate due to a low viscosity of the carbon dioxide absorbent composition, and when the content of the solid raw material is more than 50 parts by weight, the moldability of the absorbent may deteriorate due to the deterioration in fluidity of the carbon dioxide absorbent composition.

The solvent is a material that adjusts the viscosity of a carbon dioxide absorbent composition. The solvent is not particularly limited, but it is preferred that the solvent includes one or more selected from the group consisting of water and an alcohol-based solvent (for example, methanol, ethanol, and the like).

Meanwhile, the carbon dioxide absorbent composition of the present invention may further include one or more additives selected from the group consisting of a dispersant, an antifoaming agent, and an organic binder.

The dispersant is a material that improves the dispersibility of a solid raw material. That is, the solid raw material is pulverized in the process of producing the carbon dioxide absorbent composition, and in this case, in order to prevent aggregation of the pulverized solid raw material particles and uniformly disperse the solid raw material particles, the carbon dioxide absorbent composition may further include a dispersant. The dispersant is not particularly limited, but it is preferred that the dispersant includes one or more selected from the group consisting of an anionic dispersant, a cationic dispersant, an amphoteric dispersant, and a non-ionic dispersant. Examples of the anionic dispersant include polycarboxylic acid, polycarboxylic acid amine, polycarboxylic acid amine salt, polycarboxylic acid sodium salt, or the like, and examples of the non-ionic dispersant include a fluorine-based surfactant.

A content of the dispersant is not particularly limited, but is preferably 0.01 to 10 parts by weight based on 100 parts by weight of the solid raw material. Specifically, it is preferred that the content of the cationic dispersant is 0.1 to 10 parts by weight based on 100 parts by weight of the solid raw material, and it is preferred that the content of the non-ionic dispersant is 0.01 to 0.3 part by weight based on 100 parts by weight of the solid raw material. When the content of the dispersant is less than 0.01 part by weight, the dispersibility of the carbon dioxide absorbent composition may deteriorate, and when the content of the dispersant is more than 10 parts by weight, the absorption performance of carbon dioxide of the absorbent may deteriorate.

The antifoaming agent is a material that removes bubbles in the carbon dioxide absorbent composition. The antifoaming agent is not particularly limited, but it is preferred that the antifoaming agent includes one or more selected from the group consisting of a metal soap-based surfactant and a polyester-based surfactant.

A content of the antifoaming agent is not particularly limited, but is preferably 0.01 to 0.2 parts by weight based on 100 parts by weight of the solid raw material. When the content of the antifoaming agent is less than 0.01 part by weight, it may be difficult to obtain an absorbent having a spherical shape, and when the content of the antifoaming agent is more than 0.2 part by weight, toxic gases may be generated during the process of producing the absorbent.

The organic binder is a material that imparts plasticity and fluidity to the carbon dioxide absorbent composition and increases the strength of the absorbent. The organic binder is not particularly limited, but it is preferred that the organic binder includes one or more selected from the group consisting of a polyvinyl alcohol-based organic binder, a polyglycol-based organic binder, and methyl cellulose.

A content of the organic binder is not particularly limited, but is preferably 0.5 to 5 parts by weight based on 100 parts by weight of the solid raw material. When the content of the organic binder is less than 0.5 part by weight, it may be difficult to obtain an absorbent having a spherical shape due to the reduction in bonding strength between the respective components, and when the content of the organic binder is more than 5 parts by weight, the absorption performance of carbon dioxide of the absorbent may deteriorate due to the residual ash after sintering.

Meanwhile, a pH adjuster may be added to the carbon dioxide absorbent composition of the present invention in order to adjust the pH of the composition. The pH adjuster is not particularly limited, but examples thereof include organic amine, ammonia water, or the like.

The viscosity of the carbon dioxide absorbent composition of the present invention is not particularly limited, but is preferably 300 cP or more (specifically, 300 to 1,000 cP) in consideration of production and performance of the absorbent.

A method for producing the carbon dioxide absorbent composition of the present invention is not particularly limited, but may be produced in a slurry state through the following process.

First, after a mixture is produced by mixing a solid raw material and a solvent, a dispersant, an antifoaming agent, and an organic binder are added to the mixture and mixed. A stirrer may be used for the mixing process, and the stirrer may be used during the process of adding each of the components, or may be used after each component is all added. In this case, a stirrer to be used is not particularly limited, but a general mechanical stirrer, a double helix mixer, a high-speed emulsifier, a homogenizer, a high shear blender, an ultrasonic homogenizer, and the like may be used, and may be selectively used according to the amount of each component added.

Meanwhile, a pH adjuster may be further added to the mixing process in order to adjust and stabilize the pH of the carbon dioxide absorbent composition.

Thereafter, through the process of pulverizing a mixture in which the respective raw materials are mixed such that the mixture is uniformly dispersed, a carbon dioxide absorbent composition in a slurry state is produced. In this case, it is preferred that wet pulverization (wet milling) is applied such that a problem such as particle blowout does not occur during the pulverization process. Further, during the pulverization process, a pulverizer such as a roller mill, a ball mill, an attrition mill, a planetary mill, a bead mill, and a high energy bead mill may be used, and among them, a high energy bead mill may be preferably used.

When the high energy bead mill is used, it is preferred that the amount of beads used as a pulverization medium packed is 60 to 80 vol % of a pulverizer container. Further, as the beads, yttria stabilized zirconia beads having excellent strength and stability may be used, and in this case, it is preferred that the balls have a size of 0.3 to 1.25 mm.

Meanwhile, the pulverization process may be carried out repeatedly twice or more in order to produce a uniform carbon dioxide absorbent composition. Further, a dispersant, an antifoaming agent, an organic binder, and the like may be additionally added in the pulverization process in order to facilitate transfer of the carbon dioxide absorbent composition through a pump by adjusting the fluidity of the carbon dioxide absorbent composition. In addition, a solvent may be additionally added in order to adjust the concentration and viscosity of the carbon dioxide absorbent composition produced through the pulverization process.

Here, when the solid raw material has a particle size of several μm or less, the carbon dioxide absorbent composition may be produced by omitting the pulverization process and performing only a process of mixing each component.

3. Carbon Dioxide Absorbent

The present invention provides a carbon dioxide absorbent produced by using the above-described carbon dioxide absorbent composition.

Since the carbon dioxide absorbent of the present invention is produced by using the above-described carbon dioxide absorbent composition, the absorption performance of carbon dioxide and the regeneration performance in a regeneration process are excellent. Further, since a second support for regulating the degree of absorption of moisture is contained in the carbon dioxide absorbent, deterioration in performance of the absorbent due to the adsorption of moisture may be minimized even though the carbon dioxide absorbent is used in a humid environment.

In addition, the carbon dioxide absorbent of the present invention is composed of eco-friendly components, and thus may be safely used even in the process of capturing carbon dioxide in a region where masses are densely packed.

Furthermore, the absorption reaction of carbon dioxide using the carbon dioxide absorbent of the present invention proceeds within a flue gas temperature range (40 to 150° C.), and even in the regeneration process, a minimum thermal energy (regeneration reaction temperature range: 80 to 180° C.) is consumed, so that the efficiency and economic feasibility of capturing and fixing carbon dioxide, and the like may be enhanced.

The carbon dioxide absorbent of the present invention has a particle size distribution of 30 to 400 μm, an average particle size (D50) of 60 to 200 μm, a packing density of 0.8 g/ml or more (specifically, 0.8 to 1.3 g/ml), and an abrasion index of 30% or less.

Further, the carbon dioxide absorbent of the present invention may have a spherical shape in order to minimize wear loss.

In addition, the carbon dioxide absorbent of the present invention may have a carbon dioxide absorption performance of 5 wt % or more and a regeneration performance of 80 to 100%. As described above, the carbon dioxide absorbent of the present invention may be repeatedly reused for a long period of time as the regeneration performance is excellent.

4. Method for Producing Carbon Dioxide Absorbent

The present invention provides a method for producing a carbon dioxide absorbent by using the above-described carbon dioxide absorbent composition, and the method will be specifically described as follows.

First, solid particles are produced by spray-drying the above-described carbon dioxide absorbent composition. Specifically, after the carbon dioxide absorbent composition in a slurry state is transferred to a spray dryer by using a pump, solid particles are formed by spray-drying the carbon dioxide absorbent composition. In this case, depending on the concentration, viscosity, degree of dispersion, injection pressure, and injection amount of the carbon dioxide absorbent composition and the operating conditions of the spray dryer, the shape, the average particle size, the particle size distribution, the structure, and the like of the carbon dioxide absorbent may vary, so that it is preferred to appropriately control these parameters.

A method for spraying the carbon dioxide absorbent composition is not particularly limited, but it is preferred to use a counter-current spray method for spraying (jetting) the carbon dioxide absorbent composition in a direction opposite to the flow of dry air by using a pressurized nozzle in order to control the average particle size of the absorbent particles. Further, it is preferred to adjust the injection pressure of the spray dryer, the inner diameter of the pressurized nozzle, the inlet temperature of the spray dryer, and the outlet temperature of the spray dryer to 5 to 15 kg/cm$^2$, 0.4 to 1.6 mm, 240 to 300° C., and 110 to 150° C., respectively.

It is preferred that the particle size distribution of the solid particles produced by the spray drying is 30 to 330 μm.

Meanwhile, a process of removing impurities included in the carbon dioxide absorbent composition may be additionally performed before performing the spray drying in order to increase the purity of the carbon dioxide absorbent. A method for removing the impurities is not particularly limited, but impurities may be removed through sieving.

Next, the produced solid particles are dried at a temperature within a range of 110 to 150° C. In this case, the drying may be performed under the air atmosphere, and it is preferred that the drying time is 2 hours or more.

Subsequently, a carbon dioxide absorbent is produced by subjecting the dried solid particles to a firing process at a temperature within a range of 350 to 1,000° C. Specifically, the dried solid particles are put into a firing furnace, the final firing temperature is increased to 350 to 1,000° C. at a rate of 0.5 to 10 ml/min, and then the solid particles are fired for 2 hours or more. In this case, it is possible to subjecting the dried solid particles to a process of imparting a stagnant interval of 30 minutes or more, respectively at two steps or more of the stagnant temperature until the final firing temperature is reached. Further, as the firing furnace, a muffle furnace, a tubular furnace, a kiln, and the like may be used. In addition, the firing process may be performed in a gas atmosphere such as air, nitrogen, helium, hydrogen, and water steam, and in this case, the gas flow rate may be 60 ml/min or more.

As described above, since a carbon dioxide absorbent is produced by a spray drying method in the present invention, the carbon dioxide absorbent may be mass-produced, and the carbon dioxide absorbent may be economically produced due to the high production yield.

Hereinafter, the present invention will be described in detail as follows through the Examples. However, the following Examples are only for exemplifying the present invention, and the present invention is not limited by the following Examples.

Preparation Examples 1 to 3

A solid raw material for a carbon dioxide absorbent with a total mass of 8 kg was prepared by mixing an active component, a first support, a second support, an inorganic binder, and a regeneration enhancer at the composition ratio in the following Table 1.

Comparative Preparation Examples 1 to 4

A solid raw material for a carbon dioxide absorbent with a total mass of 8 kg was prepared by mixing an active component, a first support, a second support, an inorganic binder, and a regeneration enhancer at the composition ratio in the following Table 1.

TABLE 1

| | Component | Preparation Example 1 | Preparation Example 2 | Preparation Example 3 | Comparative Preparation Example 1 | Comparative Preparation Example 2 | Comparative Preparation Example 3 | Comparative Preparation Example 4 |
|---|---|---|---|---|---|---|---|---|
| Active component | $K_2CO_3$ | 35 | 35 | 35 | 35 | 35 | 35 | 35 |
| First support | γ-Alumina | 4 | 4 | 4 | 5 | 4 | 4 | 4 |
| | α-Alumina (Daehan) | 21 | — | 21 | 30 | 21 | 21 | 21 |
| | α-Alumina (Sasol) | — | 21 | — | — | — | — | — |
| | Synthetic CalciumSilicate | 11 | 11 | — | — | 13 | 13 | 13 |
| | Ceria | 1 | — | 1 | — | — | — | — |
| | Ceriumlanthanate | — | 1 | — | — | — | — | 5 |
| Second support | Lanthanum carbonate | — | 1 | — | — | — | — | — |
| | Lanthanum aluminate | 1 | — | — | — | — | — | — |
| | Zinc borate | — | — | 12 | — | — | — | — |
| Inorganic binder | Bentonite | 5 | 5 | 5 | — | 5 | 5 | 5 |
| | Pseudo-Boehmite | 5 | 5 | 5 | — | 5 | 5 | 5 |
| Regeneration enhancer | Titania(MC-150, Ishiharasangyo) | 5 | 5 | 5 | — | 5 | 5 | — |
| | Zirconia | 12 | 12 | 12 | 30 | 12 | 12 | 12 |
| | Total (wt %) | 100 | 100 | 100 | 100 | 100 | 100 | 100 |

Examples 1 to 3 and Comparative Examples 1 to 4

The solid raw material, the dispersant, the antifoaming agent, and the organic binder each prepared in Preparation Examples 1 to 3 and Comparative Preparation Examples 1 to 4 were added to water, and the resulting mixture was stirred by a stirrer (speed: 10,000 to 25,000 rpm) for 10 minutes. Thereafter, a carbon dioxide absorbent composition in a slurry state was produced by pulverizing and homogenizing the solid raw material approximately twice using a high-energy bead mill. In this case, the composition of each component is shown in the following Table 2, and the pH of the carbon dioxide absorbent composition was adjusted by organic amine.

TABLE 2

| | Component | Example 1 | Example 2 | Example 3 | Comparative Example 1 | Comparative Example 2 | Comparative Example 3 | Comparative Example 4 |
|---|---|---|---|---|---|---|---|---|
| | Solid raw material (parts by weight) | 100 | 100 | 100 | 100 | 100 | 100 | 100 |
| Dispersant (parts by weight) | Non-ionic dispersant (SANNOOCO Cerasperse 5468CF) | 0.055 | 0.055 | 0.055 | 0.055 | 0.055 | 0.055 | 0.055 |
| | Anionic dispersant (SANNOOCO Cerasperse 6067M) | 1.55 | 1.55 | 1.55 | 1.55 | 1.55 | 1.55 | 1.55 |
| Antifoaming agent (parts by weight) | SANNOOCO Antifoamer 551 | 0.055 | 0.055 | 0.055 | 0.055 | 0.055 | 0.055 | 0.055 |
| Organic binder (parts by weight) | Polyethylene glycol | 3 | 3 | 3 | 3 | 3 | 3 | 3 |

TABLE 2-continued

| Component | Example 1 | Example 2 | Example 3 | Comparative Example 1 | Comparative Example 2 | Comparative Example 3 | Comparative Example 4 |
|---|---|---|---|---|---|---|---|
| Concentration (wt %) of Composition | 37.1 | 36.5 | 40.0 | 36.9 | 37.9 | 37.3 | 41.8 |
| pH of Composition | 10.9 | 11.03 | 10.7 | 11.28 | 11.86 | 10.98 | 11.37 |
| Viscosity (cP) of Composition | 670 | 580 | 300 | 583 | 710 | 680 | 733 |

Preparation Examples 1 to 3 and Comparative Preparation Examples 1 to 4

After impurities were removed by sieving the carbon dioxide absorbent composition each produced in Examples 1 to 3 and Comparative Examples 1 to 4, spherical solid particles were produced by putting the resulting carbon dioxide absorbent composition into a spray dryer and jetting the carbon dioxide absorbent composition. In this case, the operation conditions of the spray dryer were set to an injection pressure of 6 to 10 kg/cm$^2$, a nozzle inner diameter of 0.9 mm, a dryer inlet temperature of 280° C., and a dryer outlet temperature of 120° C. Next, the produced solid particles were put into a reflux drier at 110° C. and dried for approximately 2 hours. Thereafter, the dried solid particles were put into a sintering furnace, warmed to 550° C. at a rate of 5° C./min, and then fired for approximately 2 hours to produce a carbon dioxide absorbent.

Experimental Example 1

Physical properties of the carbon dioxide absorbent each produced in Preparation Examples 1 to 3 and Comparative Preparation Examples 1 to 4 were evaluated as follows, and the results thereof are shown in Table 3.

1. Average Particle Size and Particle Size Distribution: were measured in accordance with ASTM E-11 after 10 g of an absorbent sample was sieved by a sieve shaker for 30 minutes.

2. Packing Density: was measured in accordance with ASTM D 4164-88.

3. Abrasion Index (AI): was measured in accordance with ASTM D 5757-95 by using an abrasion index measuring device (3-hole attrition tester) (when the abrasion index is less than 30%, the abrasion index is evaluated as excellent).

4. Absorption Performance of Carbon Dioxide and Regeneration Performance of Absorbent: were measured repeatedly three times (Absorption-Regeneration-Absorption-Regeneration-Absorption) by using a thermogravimetric analysis (TGA). The weight of the used absorbent sample was 10 mg, and the total flow rate was set to 60 ml/min. The absorption reaction of carbon dioxide and the regeneration reaction of the absorbent were measured at 50 and 130, respectively. The gas composition used in the absorption reaction was 14.5 vol % of carbon dioxide, 5.4 vol % of oxygen, 10 vol % of water (steam), and 70.2 vol % of nitrogen, and the gas composition used in the regeneration reaction was 100 vol % of nitrogen.

TABLE 3

| | | Preparation Example 1 | Preparation Example 2 | Preparation Example 3 | Comparative Preparation Example 1 | Comparative Preparation Example 2 | Comparative Preparation Example 3 | Comparative Preparation Example 4 |
|---|---|---|---|---|---|---|---|---|
| Average particle size (μm) | | 142 | 158 | 143 | 193 | 150 | 154 | 133 |
| Particle size distribution (μm) | | 45~302.5 | 45~196 | 45~355 | 45~355 | 45~355 | 45~355 | 45~355 |
| Packing density (g/ml) | | 1.01 | 1.01 | 1.15 | 1.29 | 1.18 | 1.02 | 1.12 |
| Abrasion index (%) | | 2.24 | 1.92 | 0.58 | 20.58 | 4.56 | 0.84 | 0.86 |
| Absorption performance (wt %) of carbon dioxide | 1st | 10.53 | 10.22 | 8.87 | 10.82 | 10.38 | 10.98 | 7.72 |
| | 2nd | 10.12 | 9.91 | 8.88 | 7.80 | 8.21 | 7.8 | 7.71 |
| | 3rd | 10.1 | 9.89 | 8.82 | 7.25 | 7.96 | 7.25 | 7.72 |
| Regeneration performance (%) | | 96 | 97 | 99 | 67 | 76 | 66 | 100 |

Referring to Table 3, it can be confirmed that the carbon dioxide absorbent according to the present invention has a low abrasion index, and has not only excellent absorption performance of carbon dioxide but also excellent regeneration performance.

The invention claimed is:

1. A solid raw material for a carbon dioxide absorbent, comprising: an active component; a first support; a second support; an inorganic binder; and a regeneration enhancer, wherein the second support comprises one or more selected from the group consisting of lanthanum aluminate, lanthanum carbonate, lanthanum acetate, lithium borate, sodium borate, and zinc borate, and wherein the second support has a specific surface area of 10 $m^2/g$ or more.

2. The solid raw material of claim 1, wherein the active component comprises one or more selected from the group consisting of alkali metal oxides, alkaline earth metal oxides, alkali metal carbonates, alkaline earth metal carbonates, alkali metal bicarbonates, alkaline earth metal bicarbonates, and precursors thereof.

3. The solid raw material of claim 1, wherein the first support comprises one or more selected from the group consisting of alumina, calcium silicate, magnesia, silica, hydrotalcite, ceria, lanthania, yttria, and tin oxide.

4. The solid raw material of claim 1, wherein the inorganic binder comprises one or more selected from the group consisting of cements, clays, and ceramics.

5. The solid raw material of claim 1, wherein the regeneration enhancer comprises one or more selected from the group consisting of titania and zirconia.

6. The solid raw material of claim 1, wherein the solid raw material comprises: 5 to 70 parts by weight of the active component; 1 to 70 parts by weight of the first support; 1 to 60 parts by weight of the second support; 5 to 70 parts by weight of the inorganic binder; and 1 to 60 parts by weight of the regeneration enhancer.

7. The solid raw material of claim 1, wherein the second support is a spherical particle having a size of 5 μm or less.

8. A solid raw material for a carbon dioxide absorbent, comprising: an active component; a first support; a second support; an inorganic binder; and a regeneration enhancer, wherein the second support comprises one or more selected from the group consisting of lanthanum aluminate, lanthanum carbonate, lanthanum acetate, lithium borate, sodium borate, and zinc borate, wherein the second support is a spherical particle having a size of 5 μm or less.

* * * * *